July 27, 1937.   A. HORLEBECK ET AL   2,087,912
METHOD OF PRODUCING CRUSTLESS FANCY BREAD
Filed May 25, 1936
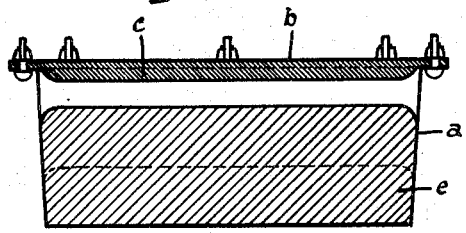
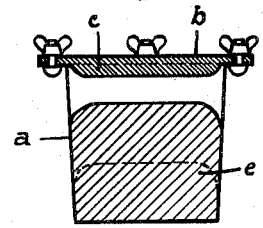
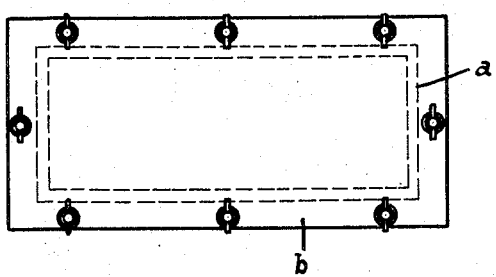

Patented July 27, 1937

2,087,912

UNITED STATES PATENT OFFICE 2,087,912

METHOD OF PRODUCING CRUSTLESS FANCY BREAD

Albert Horlebeck and Clemens Wiesmann, Wuppertal-Barmen, Germany

Application May 25, 1936, Serial No. 81,690
In Germany March 28, 1935

1 Claim. (Cl. 107—54)

A crust is formed by the action of the baking heat when baking without tins, the thickness of the crust depending on the duration of the baking process and the temperature. Such crust is often not desired. It has become known to bake bread and other articles in box-like tins so that the formation of crust is reduced except on one side of the article. In these tins one side has to remain open to enable the gases and vapours developed during the baking to escape. It has also been proposed to bake or boil doughs in vessels or hollow tins closed on all sides. In this instance a leaky tin or a tin having narrow apertures was used to allow the escapement of the gases from fermentation formed during the baking. The opinion prevailed that the escapement of the gases was essential as otherwise the gases from fermentation and the steam would cause the tin to burst.

The known baking methods possess certain inconveniences, i. e. high baking loss resulting in loss of nutritive substances and of the alcohol formed during the fermentation. The baked articles are usually not very durable. Similar phenomena occur in a known two-phase baking method, wherein the baking tin is open in the first phase and closed in the second phase, as during the first baking phase wherein the development of steam and gas from fermentation is strongest, the steam and gases can escape.

It has also been proposed to carry out the baking in absolutely tight, soldered tins in an ordinary oven, so that the baking process takes place in the air-tightly closed tin and the steam and gases from fermentation cannot escape. As the baked dough does not completely fill the tin, steam and gases collect in the remaining hollow space. During the subsequent gradual cooling the steam and gases from fermentation deposit and settle in the baked articles, which have a tendency to cake and stick on the tin, so that they have to be cut out. The baked articles thus produced are not as easily digestible as those baked according to the open baking method as the acid content is higher in the articles baked in sealed tins than in the articles baked in the open tin, owing to the fact that the undesirable constituents which form during the baking cannot be absorbed.

According to the invention bread and other baker's ware are baked from dough in a completely closed tin in which a moisture absorbent substance, for instance cellulose wool, is arranged for absorbing steam and other volatile constituents. The absorbent substance which is dry when it is inserted with the dough becomes moist or even wet at the termination of the baking, and has therefore absorbed considerable portions of the moisture of the dough. It contains besides water also alcohol, carbon dioxide and numerous other constituents. The baking process being terminated, moisture can no longer deposit on the baked articles, as it is retained in the absorbent substance and preferably removed therewith from the tin whilst the tin is still hot or warm. The baked articles can therefore neither cake on or adhere and they contain little acid and no undesirable constituents which could detrimentally influence the taste, digestibility and durability or favor the formation of mould. The baking loss is very low. The durability of the baked articles is considerably increased. Whereas bread which has been baked in the open or in the commonly used tins becomes mouldy after a few days, bread baked according to the invention is still edible after several weeks.

An apparatus suitable for carrying out the method is illustrated by way of example in the accompanying drawing in Fig. 1 in longitudinal section, in Fig. 2 in vertical section and in Fig. 3 in top plan view.

The tin $a$ closed on all sides is filled up to one third of its height with dough which has been prepared and allowed to rise in known manner. For the purpose of absorbing a portion of the moisture evaporated from the dough during the baking process a moisture absorbent substance $c$ is placed in the space remaining above the dough but at a sufficient great distance therefrom so that it does not contact with the dough after it has risen. The vapors can penetrate this absorbent substance so that the moisture can deposit therein. After the baking process which is carried out as usual under the action of heat, the tin is opened, the absorbent substance removed with the water deposited therein and the baked bread removed from the tin. To prevent the absorbed moisture from re-entering the baked bread, this latter is preferably removed from the tin whilst still hot.

The baked article removed from the tin is without crust, more digestible and will keep for a longer time.

We claim:—

The method of baking crustless bread in a closed receptacle, comprising the steps of subjecting the dough in said receptacle to a baking heat for a period of time sufficient to bake the dough and absorbing a portion of the vapors and gases given off by the bread during said baking period.

ALBERT HORLEBECK.
CLEMENS WIESMANN.